(12) United States Patent
Prat et al.

(10) Patent No.: US 9,338,135 B2
(45) Date of Patent: May 10, 2016

(54) DEVICE, SYSTEM AND METHOD OF MAINTAINING CONNECTIVITY OVER A VIRTUAL PRIVATE NETWORK (VPN)

(75) Inventors: Gideon Prat, Haifa (IL); Uri Kahana, Givat-Ada (IL)

(73) Assignee: INTEL CORPORATION, Santa Clara, CA (US)

( * ) Notice: Subject to any disclaimer, the term of this patent is extended or adjusted under 35 U.S.C. 154(b) by 4 days.

(21) Appl. No.: 13/976,122

(22) PCT Filed: Sep. 30, 2011

(86) PCT No.: PCT/US2011/054451
§ 371 (c)(1),
(2), (4) Date: Jun. 26, 2013

(87) PCT Pub. No.: WO2013/048507
PCT Pub. Date: Apr. 4, 2013

(65) Prior Publication Data
US 2013/0276094 A1    Oct. 17, 2013

(51) Int. Cl.
*H04W 4/06* (2009.01)
*H04L 29/06* (2006.01)
*H04L 9/12* (2006.01)

(52) U.S. Cl.
CPC ........ *H04L 63/0245* (2013.01); *H04L 63/0227* (2013.01); *H04L 63/0272* (2013.01)

(58) Field of Classification Search
CPC .................. H04L 12/4641; H04L 2012/5621; H04L 12/4633; H04L 63/0272; G05B 2219/34038
See application file for complete search history.

(56) References Cited

U.S. PATENT DOCUMENTS

| | | | |
|---|---|---|---|
| 7,133,374 B2 | 11/2006 | Lo et al. | |
| 7,209,962 B2 | 4/2007 | Boden | |
| 2003/0172264 A1* | 9/2003 | Dillon | 713/160 |
| 2003/0179725 A1 | 9/2003 | Lo et al. | |
| 2004/0123139 A1 | 6/2004 | Aiello et al. | |
| 2005/0165944 A1* | 7/2005 | Xue et al. | 709/232 |
| 2006/0168656 A1* | 7/2006 | Stirbu | 726/15 |
| 2006/0236093 A1* | 10/2006 | Brok et al. | 713/151 |
| 2007/0271606 A1* | 11/2007 | Amann et al. | 726/15 |
| 2008/0004011 A1* | 1/2008 | Ober | 455/435.1 |
| 2008/0195733 A1 | 8/2008 | Detienne et al. | |
| 2009/0133115 A1* | 5/2009 | Heninger et al. | 726/15 |
| 2010/0157863 A1* | 6/2010 | Gong et al. | 370/311 |
| 2010/0325719 A1* | 12/2010 | Etchegoyen | 726/15 |
| 2011/0173420 A1* | 7/2011 | Chen et al. | 712/220 |
| 2011/0194474 A1 | 8/2011 | Kim et al. | |
| 2011/0277028 A1* | 11/2011 | Piazza et al. | 726/11 |

FOREIGN PATENT DOCUMENTS

CN    1372407    10/2002

OTHER PUBLICATIONS

International Preliminary Report on Patentability and Written Opinion for International Patent Application No. PCT/US2011/054451, mailed on Apr. 10, 2014, 7 pages.
International Search Report and Written Opinion for PCT/US2011/054451, mailed on May 30, 2012; 10 pages.
IEEE Standard for Information technology—Telecommunications and information exchange between systems—Local and metropolitan area networks—Specific requirements. Part 11: Wireless LAN Medium Access Control (MAC) and Physical Layer (PHY) Specifications. IEEE Std 802.117™—2007 (Revision of IEEE Std 802.11-1999 ).
Extended European Search Report for European Patent Application No. 11873435.9, mailed on May 13, 2015, 7 pages.
Office Action for Chinese Patent Application Serial No. 201180073882.9, mailed on Mar. 16, 2016, 24 pages (including 13 pages of English translation).

* cited by examiner

*Primary Examiner* — Venkat Perungavoor
(74) *Attorney, Agent, or Firm* — Shichrur & Co.

(57) ABSTRACT

Some demonstrative embodiments include devices, systems and/or methods of maintaining connectivity over a Virtual-Private-Network (VPN). For example, a system may include a server to communicate with at least one computing device via a VPN tunnel, to receive from the computing device a mode indication indicating that the computing device is in a standby mode, to receive from at least one application server one or more packets intended for the computing device when the computing device is in the standby mode, based on at least one filtering criterion, to detect at least one targeted packet to be provided to the computing device, and to transfer the targeted packet to the computing device via the VPN tunnel.

21 Claims, 3 Drawing Sheets

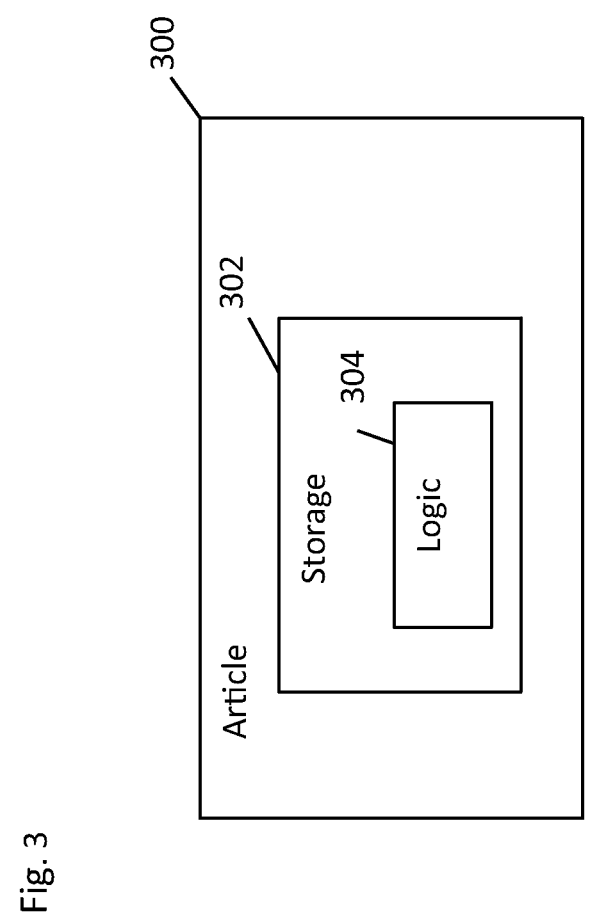

DEVICE, SYSTEM AND METHOD OF MAINTAINING CONNECTIVITY OVER A VIRTUAL PRIVATE NETWORK (VPN)

CROSS REFERENCE

This application is a National Phase Application of PCT International Application No. PCT/US2011/054451, International Filing Date Sep. 30, 2011, the entire disclosure of which is incorporated herein by reference.

BACKGROUND

A computing device may operate in an Always On Always Connected (AOAC) mode. In the AOAC mode, the computing device may have a continuous network connection to one or more designated application servers ("the application servers"), e.g., enterprise application servers, via a communication network, while the computing device is operating in a standby mode, e.g., having relatively low power consumption.

When operating in the AOAC mode, the computing device may keep the network connection open in order to receive updates from the application servers to one or more applications installed on the computing device ("the client applications"). For example, a computing device running an email application, may keep the network connection open, while in the standby mode, in order to update the email application from an email application server.

Upon receiving a targeted packet, e.g., indented to the client applications, the computing device may be switched to an active mode, e.g., full operational mode, and may activate the client applications in order to receive and handle the targeted packet. For example, a notebook in standby mode, e.g., having the notebook lid closed, may be activated and may activate the mail application upon receiving an email message indented to the computing device.

In order to avoid activating the computing device by an unauthorized incoming packet, e.g., a packet not intended to any of the client applications, the computing device may utilize a filtering criterion to recognize and filter received packets before activating the computing device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of an article of manufacture, in accordance with some demonstrative embodiments.

DETAILED DESCRIPTION

Figure 1:
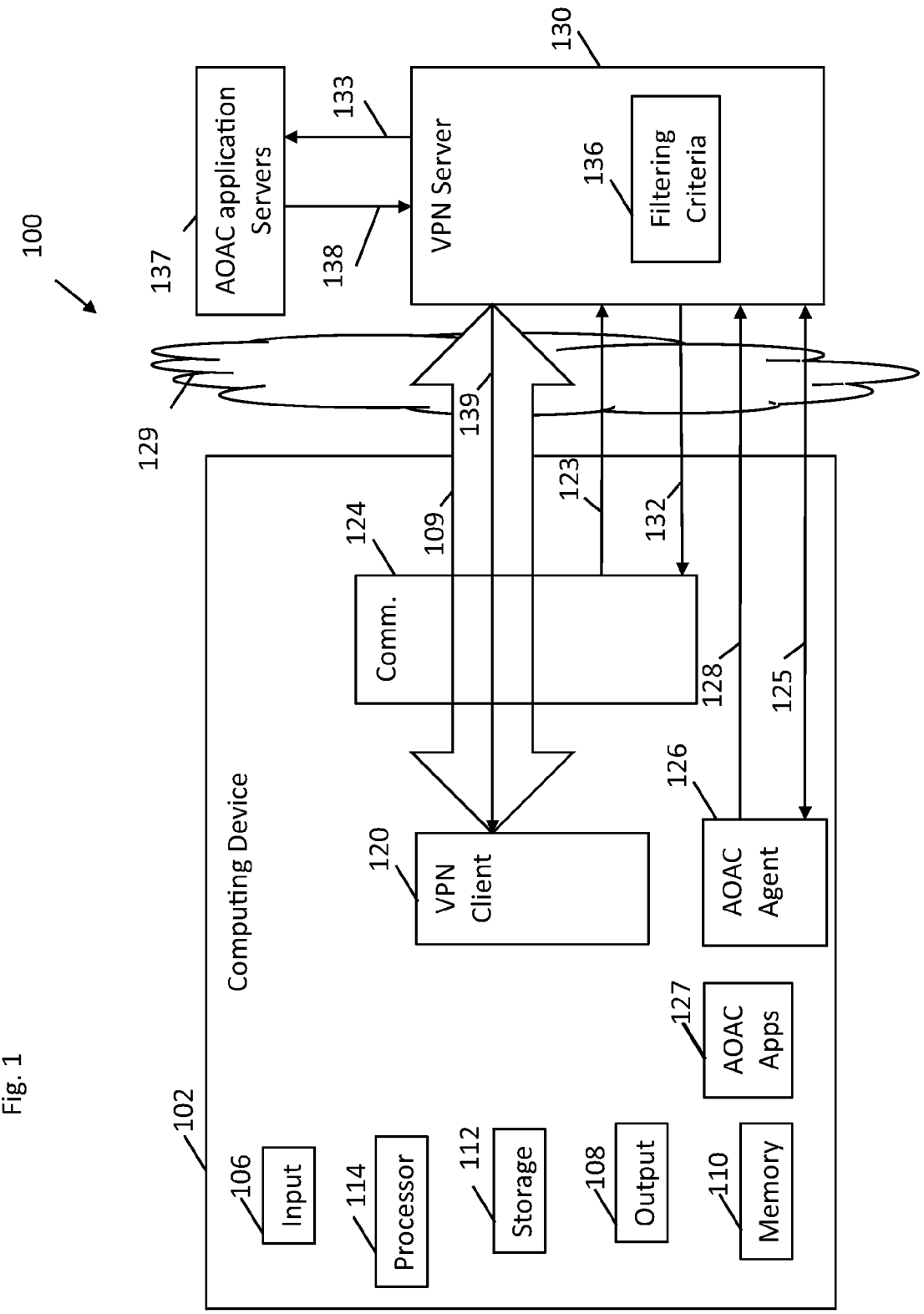
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (IEEE 802.11-2007: Standard for Information technology—Telecommunications and information exchange between systems—Local and metropolitan area networks—Specific requirements, Part 11: Wireless LAN Medium Access Control (MAC) and Physical Layer (PHY) Specifications—June 2007), and/or future versions and/or derivatives thereof, devices, and/or networks operating in accordance with IEEE 802.16 standards ("the 802.16 standards"), e.g., including 802.16 (IEEE-Std 802.16, 2004 Edition, Air Interface for Fixed Broadband Wireless Access Systems), standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

The terms "powering down" and "power down" as used herein with relation to a device, unit, element, module and/or a component may refer, for example, to reducing, diminishing, shutting down, powering off, turning off and/or switching off the electrical current to the device, unit, element, module and/or a component, and/or to switching the device, unit, element, module and/or a component to operate at a sleep mode, a reduced-power mode, a hibernate mode, a stand-by mode and/or any other operation mode which consumes less power than required for full and/or normal operation of the device, unit, element, module and/or a component. For example, powering down a computing device, e.g., a computing device which is configured to receive, handle and/or process a message, a component of a computing device, one or more hardware (HW) and/or software (SW) components of the computing device, and/or an Operating System (OS) of the computing device may include reducing, diminishing, shutting down, powering off, turning off and/or switching off the electrical current to the computing device, the component of the computing device, the one or more HW and/or software SW components of the computing device, and/or the OS of the computing device; and/or to switching the computing device, the component of the computing device, the one or more HW and/or software SW components of the computing device, and/or the OS of the computing device to operate at a sleep mode, a reduced-power mode, a hibernate mode, a stand-by mode and/or any other operation mode which consumes less power than required for full operation, e.g., for full reception, handling, and/or processing the message.

The terms "powering up" and "power up" as used herein with relation to a device, unit, element, module and/or a component may refer, for example, to enhancing, resuming, turning on and/or switching on the electrical current to the device, unit, element, module and/or a component, and/or to switching the device, unit, element, module and/or a component from sleep mode, stand by mode or any other operation mode, which consumes less power than required for full reception and/or normal operation of the device, unit, element, module and/or a component, and/or to switching the device, unit, element, module and/or a component, to operational mode. For example, powering up a computing device, e.g., a computing device which is configured to receive, handle, and/or process a message, a component of a computing device, one or more HW and/or SW components of the computing device, and/or an OS of the computing device may include enhancing, resuming, turning on and/or switching on the electrical current to the computing device, the component of the computing device, the one or more HW and/or software SW components of the computing device, and/or the OS of the computing device; and/or to changing the computing device, the component of the computing device, the one or more HW and/or software SW components of the computing device, and/or the OS of the computing device from sleep mode, a reduced-power mode, a hibernate mode, a stand-by mode and/or any other operation mode which consumes less power than required for full operation, to operational mode, e.g., for full reception, handling and/or processing the message.

The term "Always-On-Always-Connected (AOAC)" as used herein with relation to a computing device may refer to a reduced-power state and/or mode, e.g., a very low power state and/or mode, of operation of the computing device, at which one or more units, elements and/or components of the computing device are powered down, such that the computing device may operate at a reduced power consumption, e.g., at a very low power consumption, while maintaining connectivity, e.g., substantially constant connectivity, to one or more network services and/or applications. For example, a mobile computing device, e.g., a handheld device, a cell phone, a notebook computer, and the like, may operate at a AOAC state to provide user-perceived constant connectivity to one or more services and/or applications, e.g., an email service, an Instant messaging (IM) service, a Voice Over Internet Protocol (VoIP) service, and the like, while maintaining a relatively low level of usage of a battery of the mobile computing device. In one example, a notebook computer may be configured to switch from an active state to an AOAC state, e.g., when a user closes a lid of the notebook computer. During the AOAC state, the notebook computer may power down one or more components of the notebook computer, e.g., a core processor, a display, a memory, a chipset, a hard disk, and the like, while one or more components, e.g., a network communication module, may remain active to detect one or more messages from a predefined network service and/or application.

In some demonstrative embodiments, a computing device may communicate with one or more application servers to receive packets, e.g., intended for one or more applications ("device applications") executed by the computing device. For example, a notebook, which executes an email application may communicate with an enterprise email server to receive mail messages intended for the email application.

In some demonstrative embodiments, the computing device may maintain a continuous network connection to the application servers, e.g., to receive the packets and keep the device applications updated.

In some demonstrative embodiments, the computing device may operate at an AOAC mode, and upon receiving the packets, the computing device may be switched to an active mode to receive and handle the packets. For example, the notebook may operate in the standby mode, and may be activated upon receiving a mail message from the enterprise email server.

In some demonstrative embodiments, in order to avoid activating the computing device by an unauthorized incoming packet, e.g., a packet not intended for any of the client applications, a suitable filtering criterion may be implemented to recognize and filter packets before activating the computing device.

In some demonstrative embodiments, the computing device may include a Virtual-Private-Network (VPN) module to communicate with a VPN server via a VPN tunnel. For example, an enterprise may use a VPN over a public communication network to increase security.

In some demonstrative embodiments, the utilization of the VPN may prevent the computing device from detecting and recognizing the targeted packets, for example, due to the VPN encryption.

In some demonstrative embodiments, if all the incoming packets are transferred to the computing device, the power consumption of the computing device may be increased, for example, if the computing device is activated e.g., powered up, periodically in order to detect and check the incoming packets, or if the computing device is constantly activated, e.g., operating in full operational mode, to receive and handle the incoming packets.

In some demonstrative embodiments, the VPN server may be configured to act as a proxy filter for filtering packets for the computing device, when the device is operating in standby mode.

In some demonstrative embodiments, the VPN server may be configured to receive incoming packets from the application servers, to detect and recognize the targeted packets, and once detected, the VPN server may transfer the targeted packets to the computing device. Accordingly, the utilization of the VPN server to detect and recognize the incoming packets may enable the computing device to operate in the AOAC mode efficiently, while maintaining connectivity to the application servers over the VPN, e.g., without increasing the power consumption of the computing device, and/or without compromising the security of the VPN.

In some demonstrative embodiments, the computing device may include an agent module configured to provide the VPN server with a mode indication indicating that the computing device is operating in a standby mode.

In some demonstrative embodiments, the VPN server may be configured to apply at least one filtering criterion to one or more of the incoming packets received from at least one application server, when the computing device is in the standby mode.

In some demonstrative embodiments, the VPN server may be configured to detect at least one targeted packet to be provided to the computing device based on the filtering criterion, and to transfer the targeted packet to the computing device via the VPN tunnel.

In some demonstrative embodiments, the computing device may include a communication module configured to communicate with the VPN server over a communication channel, to receive a wake packet from the VPN server, prior to receiving the targeted packet, and to cause the computing device to switch from the standby mode to the active mode upon receiving the wake packet.

Reference is now made to FIG. 1, which schematically illustrates a block diagram of a communication system 100, in accordance with some demonstrative embodiments.

In some demonstrative embodiments, system 100 may include one or more computing devices, e.g., computing device 102, capable of communicating with one or more servers, over at least one communication network 129, e.g., as described below.

In some demonstrative embodiments, communication network 129, may include, for example, any suitable wired and/or wireless communication network.

In some demonstrative embodiments, communication network 129 may include a public, e.g., unsecured and/or open, communication network.

In some demonstrative embodiments, device 102 may include, or may be included as part of, for example, a PC, a desktop computer, a mobile computer, a laptop computer, a notebook computer, a tablet computer, a server computer, a handheld computer, a handheld device, a PDA device, a hand-held PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may also include, for example, one or more of a processor 114, an input unit 106, an output unit 108, a memory unit 110, and a storage unit 112. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of device 102 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by device 102.

In some demonstrative embodiments, device 102 may include one or more AOAC applications 127. AOAC applications 127 may include one or more client applications or services, e.g., Email, Instant Messaging (IM), and/or Voice Over Internet Protocol (VoIP), services and/or applications, and the like, which require maintaining connectivity in the AOAC mode In some demonstrative embodiments, AOAC applications 127 may require a continuous connectivity to communication network 129 in order to receive updates and keep AOAC applications 127 updated from one or more AOAC application servers 137.

In some demonstrative embodiments, AOAC application servers 137 may include one or more application servers, e.g., email server, Instant messaging (IM) server and/or Voice Over Internet Protocol (VoIP) server, and the like, which may provide messages, information and/or updates to AOAC applications 127

In some demonstrative embodiments, AOAC application servers 137 may be configured to update AOAC applications 127 by sending packets 138, e.g., intended to device 102, configured to update AOAC applications 127, via communication network 129.

In some demonstrative embodiments, device 102 may include at least one communication module 124 configured to communicate over communication network 129. For example, communication module 124 may include a wireless communication module, e.g., a wireless NIC, if communication network 129 includes a wireless communication network. Communication module 124 may communicate messages between AOAC applications 127 and AOAC application servers 137. For example, an Email application, may receive email messages from email server via communication module 124.

In some demonstrative embodiments, device 102 may be configured to operate in an Always On Always Connected (AOAC) mode. For example, when operating in the AOAC mode, one or more units, elements and/or components of device 102 may be powered down, while maintaining connectivity, e.g., substantially constant connectivity, to one or more network services and/or applications, e.g., as described below. For example, device 102 may include a notebook which operates in a standby mode, e.g., having the notebook lid closed, while maintaining connectivity to AOAC application servers 137 over a wireless communication network 129, in order to update AOAC applications 127.

In some demonstrative embodiments, device 102 may be capable of switching the mode of operation of one or more components of device 102 from the standby mode to an active mode, in which device 102 may be powered up to full operational mode, e.g., for full reception, handling and/or processing communication, tasks and the like.

In some demonstrative embodiments, system 100 may implement a VPN to connect device 102 and AOAC application servers 137 via communication network 129, e.g., in order to maintain a secure connection between device 102 and AOAC application servers 137. For example, an enterprise may wish to provide a user of AOAC applications 127, e.g., an email application running on a notebook or a Smartphone, with access to application servers 137, e.g., an enterprise Email server, via a secure connection, over a public communication network.

In some demonstrative embodiments, device 102 may include a VPN client module 120 configured to enable VPN communication over communication network 129.

In some demonstrative embodiments, system 100 may include a VPN server 130 configured to enable VPN communication between device 102 and AOAC application servers 137, via a VPN tunnel 109 over communication network 129. For example, VPN server 130 may be utilized as a proxy server to device 102.

In some demonstrative embodiments, VPN tunnel 109 may be configured to tunnel the communication between computing device 102 and AOAC application servers 137 over communication network 129, e.g., by encrypting communications between VPN client module 120 and VPN client server 130, and decrypting the communications, as received by each of the sides of tunnel 109.

In some demonstrative embodiments, VPN server 130 may be configured to apply at least one filtering criterion 136 to detect at least one targeted packet to be provided to device 102. For example, filtering criterion 136 may define one or more rules or conditions to be applied for filtering messages from application servers 137. Filtering criterion 136 may be based on one or more attributes of the user of computing device 102, one or more attributes of computing device 102, one or more attributes of AOAC applications 127, one or more attributes of server application 137, and the like. For example, a filtering criterion relating to an email application may define one or more rules for filtering one or more emails from an email server based, for example, on a content of the email, a sender of the email, and the like. According to this example, VPN server 130 may filter incoming email messages based on filtering criterions 136, to determined which email message should be provided to AOAC applications 127 of computing device 102, when computing device is operating in standby mode.

In some demonstrative embodiments, filtering criterion 136 may include a filtering policy to be applied to a group of computer devices, e.g., a group of enterprise computing devices, which may include device 102. For example, filtering criterion 136 may be defined and/or configured according to a centralized IT application database policy and/or a centralized enterprise policy. The filtering policy may define, one or more applications of AOAC applications 127 may be authorized to receive packets while computer device 102 is in the standby mode. For example, filtering criterion 136 may include an enterprise filtering policy defining that only messages intended to one or more predefined applications, e.g., only messages intended to an email application, should be provided to computing device 102, when operating in standby mode, while messages of other applications, e.g., VoIP applications, are not to be provided to computing device 102, when operating in standby mode.

In some demonstrative embodiments, filtering criterion 136 may be directly loaded into VPN server 130. For example, filtering criterion 136 may be loaded and/or updated, e.g., by an administration manager, during initialization and/or configuration of VPN server 130.

In some demonstrative embodiments, computing device 102 may include an AOAC agent 126 configured to provide VPN server 130 with filtering criterions 136 to be applied one or more incoming packets, in order to detect a targeted packet to device 102. For example, AOAC agent 126 may gather filtering information from AOAC application 127 to define and/or update filtering criterion 136. For example, AOAC agent 126 may receive an indication of which of AOAC applications 127 are to receive packets during standby and/or which rules are to be applied by filtering criterion.

In some demonstrative embodiments, AOAC agent 126 may be configured to communicate with VPN server 130 via an Application-Programming-Interface (API) 125. For example, AOAC agent 126 and VPN server 130 may share a predefined set of messages to communicate with each other over communication network 129 in order to facilitate communication between AOAC agent 126 and VPN server 130.

In some demonstrative embodiments, AOAC agent 126 may be configured to communicate with VPN server 130 via VPN tunnel 130.

In some demonstrative embodiments, AOAC agent 126 may be configured to provide to VPN server 130 a mode indication 128 indicating that device 102 is in standby mode. AOAC agent 126 may provide indication 128 via VPN tunnel 130, or directly via API 125. For example, API 125 between AOAC agent 126 and VPN server 130 may include a predefined shared message indicating to VPN server 130 that device 102 is in the standby mode of operation.

In some demonstrative embodiments, VPN server 130 may be configured to receive from at least one of AOAC application servers 137 one or more incoming packets 138 intended for device 102, when device 102 is in the standby mode.

In some demonstrative embodiments, VPN server 130 may be configured to block all incoming packets 138, except for packets detected as targeted packets, while device 102 is in the standby mode.

In some demonstrative embodiments, VPN server 130 may be configured to send to AOAC application servers 137 one or more messages 133 indicate that device 102 is in the active mode, when device 102 is actually at the standby mode, e.g., in order to ensure that AOAC application servers 137 may keep sending to server 130 packets intended for device 102. For example, messages 133 may include periodic keep-alive messages.

In some demonstrative embodiments, communication module 124 may be configured to send VPN server 130 one or more messages 123 to indicate that the connection between VPN server 130 and VPN client 120 should be maintained, when device 102 is in the standby mode. For example, messages 123 may include periodic keep-alive messages.

In some demonstrative embodiments, VPN server 130 may detect a targeted packet 139, e.g., intended to be provided to AOAC applications 127 according to filtering criterion 136, and may transfer targeted packet 139 to device 102 via VPN tunnel 109. For example, VPN server may detect targeted packet 139 to include a packet in compliance with filtering criterion 136.

In some demonstrative embodiments, VPN tunnel 109 may be maintained active when device 102 is in the standby mode. According to these embodiments, the reception of targeted packet 139 via VPN tunnel 109 may cause one or more components of device 102 to be switched to the active mode.

For example, communication module 124 may be configured to switch device 102 from the standby mode to the active mode, upon receiving targeted packet 139.

In some demonstrative embodiments, VPN tunnel 109 may be deactivated when device 102 is in the standby mode. According to these embodiments, VPN server 130 may be configured to send communication module 124 a wake packet 132 over communication network 129, e.g., outside of VPN tunnel 109, before transferring targeted packet 139. Computing device 102 may switch from the standby mode to the active mode, upon receiving wake packet 132. For example, communication module 124 may power up, one or more components of computing device 102 upon receiving wake packet 132. Device 102 may re-establish VPN tunnel 109, e.g., once computing device has switched to the active mode, in order to enable the transferring of targeted packet 139 to AOAC application 127 via VPN tunnel 109.

In some demonstrative embodiments, device 102 may handle the targeted packet 139 and may transfer targeted packet 139 to AOAC applications 127 for further processing.

Figure 2:
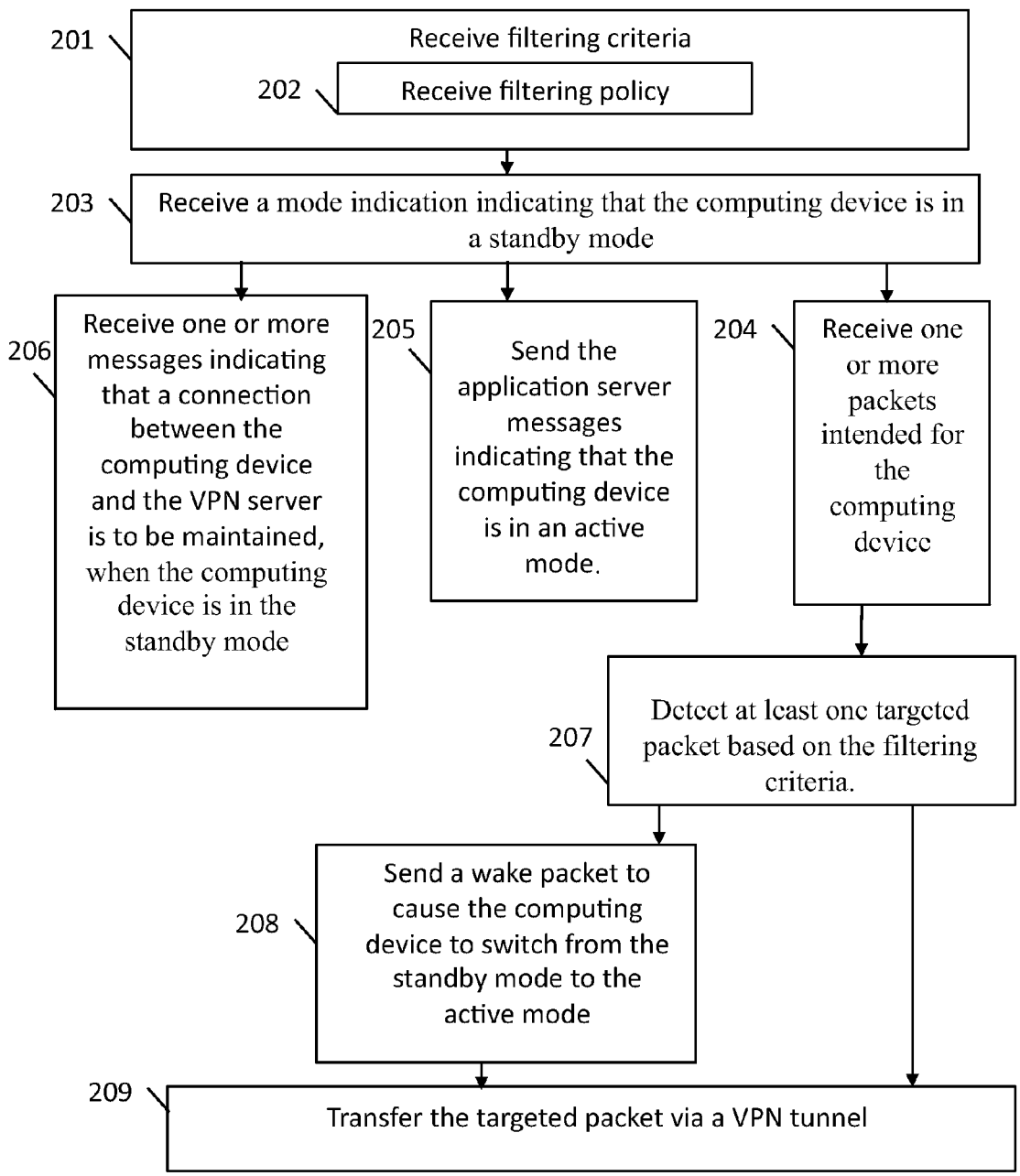
FIG. 2 is a schematic flow-chart illustration of a method of maintaining connectivity over a Virtual Private Network (VPN), in accordance with some demonstrative embodiments.

Reference is now made to FIG. 2, which schematically illustrates a method of maintaining connectivity over a VPN, in accordance with some demonstrative embodiments. In some demonstrative embodiments, one or more of the operations of the method of FIG. 2, may be performed by a system, e.g., system 100 (FIG. 1); a computing device, e.g., device 102 (FIG. 1); a server, e.g., VPN server 130 (FIG. 1); and/or a client module, e.g., VPN client module 120 (FIG. 1).

In some demonstrative embodiments, as indicated at block 201, the method may include receiving at least one filtering criterion to be applied to one or more packets received from at least one application server. For example, VPN server 130 (FIG. 1) may receive filtering criterion 136 (FIG. 1) from AOAC agent 126 (FIG. 1), e.g., as described above.

In some demonstrative embodiments, as indicated at block 202, receiving the filtering criterion may include receiving a filtering policy to be applied to a group of computing devices including the computing device. For example, VPN server 130 (FIG. 1) may receive filtering criterion 136 (FIG. 1) including a filtering policy to be applied to a group of computing devices including device 102 (FIG. 1), e.g., as described above.

In some demonstrative embodiments, as indicated at block 203, the method may include receiving from the computing device a mode indication indicating that the computing device is in a standby mode. For example, VPN server 130 (FIG. 1) may receive mode indication 128 (FIG. 1) from AOAC agent 126 (FIG. 1) indicating that device 102 (FIG. 1) is in the standby mode, e.g., as described above.

In some demonstrative embodiments, as indicated at block 205, the method may include, sending to the application server one or more messages indicating that the computing device is in an active mode, when the computing device is in the standby mode. For example, VPN server 130 (FIG. 1) may send to AOAC application servers 137 (FIG. 1) messages 133, indicating that device 102 (FIG. 1) is in the active mode, when device 102 (FIG. 1) is in the standby mode, e.g., as described above.

In some demonstrative embodiments, as indicated at block 206, the method may include, receiving from the computing device one or more messages indicating that a connection between the computing device and the VPN server is to be maintained, when the computing device is in the standby mode. For example, VPN server 130 (FIG. 1) may receive messages 123 (FIG. 1) from communication module 124 (FIG. 1), when device 102 (FIG. 1) is in standby mode, e.g., as described above.

As indicated at block 204, the method may include, receiving one or more packets intended for the computing device from at least one application server, when the computing device is in the standby mode. For example, VPN server 130 (FIG. 1) may receive one or more packets 138 (FIG. 1) indented for device 102 (FIG. 1) from at least one of AOAC application servers 137 (FIG. 1), when device 102 (FIG. 1) is in the standby mode, e.g., as described above.

As indicated at block 207, the method may include detecting at least one targeted packet of the packets to be provided to the computing device based on the filtering criterion. For example, VPN server 130 (FIG. 1) may detect targeted packet 139 (FIG. 1) to be provided to device 102 (FIG. 1) based on one or more filtering criterions 136, e.g., as described above.

As indicated at block 209, the method may include transferring the targeted packet via a Virtual-Private-Network (VPN) tunnel.

In some demonstrative embodiments, the computing device may be capable of switching the mode of operation of device 102 from the standby mode to the active mode upon receiving the targeted packet via the VPN tunnel. For example, VPN server 130 (FIG. 1) may transfer packet 139 (FIG. 1) to device 102 (FIG. 1) via VPN tunnel 109 (FIG. 1), e.g., as described above.

In some demonstrative embodiments, the computing device may deactivate the VPN tunnel when operating in the standby mode. Accordingly, as indicated at block 208, the method may include sending to the computing device a wake packet, e.g., out of the VPN tunnel, to cause the computing device to switch from the standby mode to the active mode, prior to transferring the targeted packet to the computing device via the VPN tunnel. For example, VPN server 130 (FIG. 1) may send wake packet 132 (FIG. 1) to cause device 102 (FIG. 1) to switch from the standby mode to the active mode, e.g., as described above.

Reference is made to FIG. 3, which schematically illustrates an article of manufacture 300, in accordance with some demonstrative embodiments. Article 300 may include a machine-readable storage medium 302 to store logic 304, which may be used, for example, to perform at least part of the functionality of device 102 (FIG. 1), the functionality of VPN server 130 (FIG. 1) and/or to perform one or more operations of the method of FIG. 2.

In some demonstrative embodiments, article 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A system comprising:
a Virtual-Private-Network (VPN) server to communicate with at least one computing device via a VPN tunnel, the VPN server configured to receive from said computing device a mode indication indicating that said computing device is in a standby power mode, the VPN server to receive from at least one application server one or more packets for said computing device when said computing device is in said standby power mode, said VPN server is configured to detect at least one targeted packet to be provided to said computing device based on at least one filtering criterion, the filtering criterion defining one or more attributes to trigger waking up the computing device from the standby power mode, said VPN server is configured to transfer said targeted packet to said computing device via said VPN tunnel, said VPN server is configured to send to said application server one or more messages indicating that said computing device is in an active power mode, when said computing device is in said standby power mode.

2. The system of claim 1, wherein said VPN server is configured to, prior to transferring said targeted packet, send to said computing device a wake packet to trigger said computing device to switch from said standby power mode to said active power mode.

3. The system of claim 1, wherein said VPN server is to receive said filtering criterion from said computing device.

4. The system of claim 1, wherein said filtering criterion comprises a filtering policy to be applied to a group of computing devices including said computing device.

5. The system of claim 1, wherein said one or more messages comprise periodic keep-alive messages.

6. The system of claim 1, wherein said VPN server is configured to process one or more messages from said computing device indicating that a connection between said computing device and said VPN server is to be maintained, when said computing device is in said standby power mode.

7. The system of claim 1, wherein said VPN server is to receive said mode indication via an Application-Programming-Interface (API) between said VPN server and said computing device.

8. The system of claim 1, wherein said VPN server is to receive said mode indication via said VPN tunnel.

9. A device comprising:
a communication module to communicate with a Virtual-Private-Network (VPN) server over a communication channel;
VPN client module to communicate with said VPN server via a VPN tunnel; and
an agent module to provide to said VPN server a mode indication indicating that said device is operating in a standby power mode, in which said VPN server is to apply at least one filtering criterion to one or more packets, received from at least one application server when said device is in said standby power mode, to detect at least one targeted packet to be provided to said device, the filtering criterion defining one or more attributes to trigger waking up the device from the standby power mode,
wherein said communication module is to send to said VPN server one or more messages indicating that connection between said VPN client module and said VPN server is to be maintained, when said device is in said standby power mode.

10. The device of claim 9, wherein said communication module, is configured to receive a wake packet from said VPN server, prior to receiving said targeted packet, and to cause said device to switch from said standby power mode to an active power mode upon receiving said wake packet.

11. The device of claim 9, wherein said one or more messages comprise periodic keep-alive messages.

12. The device of claim 9, wherein said VPN client module is to cause said device to switch from said standby power mode to an active power mode upon receiving said targeted packet.

13. The device of claim 9, wherein said agent module is to provide said filtering criterion to said VPN server.

14. The device of claim 9, wherein said filtering criterion comprises a filtering policy to be applied to a group of devices including said device.

15. The device of claim 9, wherein said agent module is to communicate with said VPN server via an Application-Programming-Interface (API).

16. The device of claim 9, wherein said agent module is to transfer to said VPN server via said VPN tunnel an indication that said device is operating in the standby power mode.

17. A method comprising:
sending to at least one application server one or more messages indicating that a computing device is in an active power mode, when said computing device is in a standby power mode;
receiving from the at least one application server one or more packets for the computing device, when said computing device is in the standby power mode;
based on at least one filtering criterion, detecting at least one targeted packet of said one or more packets to be provided to said computing device, the filtering criterion defining one or more attributes to trigger waking up the computing device from the standby power mode; and
transferring said targeted packet to said computing device via a Virtual-Private-Network (VPN) tunnel.

18. The method of claim 17 comprising sending to said computing device a wake packet, prior to transferring said targeted packet, to trigger said computing device to switch from said standby power mode to the active power mode.

19. The method of claim 17 comprising receiving said filtering criterion from said computing device.

20. The method of claim 17, wherein said filtering criterion comprises a filtering policy to be applied to a group of computing devices including said computing device.

21. The method of claim 17 comprising receiving from said computing device one or more messages indicating that a connection with said computing device is to be maintained, when said computing device is in said standby power mode.

* * * * *